United States Patent
Li et al.

(10) Patent No.: US 7,394,799 B2
(45) Date of Patent: Jul. 1, 2008

(54) APPARATUS AND METHOD USING SMART ANTENNA IN FDD WIRELESS COMMUNICATION SYSTEM

(75) Inventors: Shihe Li, Beijing (CN); Jun Li, Beijing (CN); Feng Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 1089 days.

(21) Appl. No.: 10/317,719

(22) Filed: Dec. 12, 2002

(65) Prior Publication Data

US 2003/0087674 A1 May 8, 2003

Related U.S. Application Data

(63) Continuation of application No. PCT/CN01/00133, filed on Feb. 20, 2001.

(30) Foreign Application Priority Data

Jun. 12, 2000 (CN) .................................. 00 1 08079

(51) Int. Cl.
H04J 1/00 (2006.01)
(52) U.S. Cl. ....................................... 370/343; 370/334
(58) Field of Classification Search ................. 370/295, 370/281, 320, 321, 335, 342, 441; 375/304, 375/315; 455/91, 92, 97, 121, 279.1, 560, 455/561, 562.1, 575.7, 553.1
See application file for complete search history.

(56) References Cited

U.S. PATENT DOCUMENTS 5,778,324 A 7/1998 Smith
6,002,947 A 12/1999 Smith
6,075,484 A * 6/2000 Daniel et al. ................. 342/372
6,122,260 A * 9/2000 Liu et al. ..................... 370/280
6,317,586 B1 * 11/2001 Haardt ..................... 455/67.16
6,477,161 B1 * 11/2002 Hudson et al. .............. 370/342
6,615,024 B1 * 9/2003 Boros et al. .............. 455/67.14
7,031,755 B2 * 4/2006 Li et al. .................... 455/562.1
2003/0050016 A1 * 3/2003 Boros et al. ................. 455/67.4

OTHER PUBLICATIONS

Kuchar et al, A Robust DOA-based Smart Antenna Processor for GSM Base Stations, IEEE, pp. 1-6, 1999.*
International Search Report corresponding to International Application No. PCT/CN01/00133 dated Apr. 5, 2001.

* cited by examiner

Primary Examiner—Frank Duong
(74) Attorney, Agent, or Firm—Alston & Bird LLP

(57) ABSTRACT

The invention relates to a method and an apparatus using smart antennas in a frequency division duplex code division multiple access mobile communication system and for solving the limitations of smart antenna use due to asymmetric propagation of uplink electric wave and downlink electric wave. In the wireless base station, there are transmitting and receiving smart antenna arrays and associated transmitters and receivers, respectively, and a common baseband signal processor. In the method, the main path direction is determined by signal direction of arrival, obtained from receiving signal; in the downlink beam forming, an expected transmitting beam form is based on the main path direction. The system can obtain advantages of smart antenna, improve cell coverage, increase system capacity and reduce cost.

7 Claims, 3 Drawing Sheets

APPARATUS AND METHOD USING SMART ANTENNA IN FDD WIRELESS COMMUNICATION SYSTEM

CROSS-REFERENCE TO RELATED APPLICATIONS

This is a continuation application of PCT/CN01/00133, filed Feb. 20, 2001, which is incorporated herein by reference in its entirety.

BACKGROUND OF THE INVENTION

1. Field of the Technology

The present invention relates generally to Code Division Multiple Access (CDMA) cellular mobile communication system, and more particularly to a smart antenna technology applied in a Frequency Division Duplex (FDD) CDMA cellular mobile communication system.

2. Description of Related Art

Smart antenna technology is one of the most important technologies in modem wireless communications. Especially, when smart antenna technology is used in a CDMA cellular mobile communication system, there are advantages, such as greatly increasing system capacity, increasing the cover range of a wireless base station, decreasing system cost and raising system performance, etc. Therefore, smart antenna technology has become an important technology concern all over the world.

At present, smart antenna technology is mainly used in time division duplex (TDD) CDMA wireless communication systems including cellular mobile communication systems, wireless subscriber loops and wireless local area networks, etc. The main reason is that in a TDD system, a transmitting channel and a receiving channel use the same frequencies and the electric-wave propagation characteristics of uplink (receiving) and downlink (transmitting) are the same. Therefore, parameters of receiving signal beam forming obtained from the uplink can be again used for downlink beam forming. Consequently, the advantages of smart antenna technologies are brought into full play.

Nevertheless, in present cellular mobile communication systems, an FDD wireless communication system is the most popular one. In a FDD wireless communication system, uplink and downlink use different carrier frequencies and the electric-wave propagation characteristics of uplink and downlink are totally different. The result is that the parameters of receiving signal beam forming obtained from the uplink cannot be again used for downlink beam forming, so the advantages of smart antenna technology cannot be brought into full play.

In a base station of a FDD wireless communication system, when using smart antennas the receiving link and the transmitting link work simultaneously with different frequency bands, so one set or multiple sets of smart antenna arrays can be used for receiving and transmitting, respectively. A working method and principle of the receiving link smart antenna using smart antenna technology in a TDD wireless communication system can be referenced in Chinese Patent ZL 97 1 04039.7 titled: "A Time Division Duplex Synchronous CDMA Wireless Communication System With Smart Antenna." However, the beam forming of the transmitting downlink cannot simply use the parameters obtained from the receiving uplink beam forming associated with every antenna unit. This is determined by unsymmetrical electric-wave propagation characteristics of uplink and downlink in a FDD wireless communication system.

SUMMARY OF THE INVENTION

The purpose of the present invention is to provide methods and apparatus for using smart antennas in a FDD wireless communication system. The methods and apparatus can overcome the obstacles of using smart antennas in a FDD CDMA mobile communication system, where such obstacles are caused by unsymmetrical electric-wave propagation characteristics of uplink and downlink. Accordingly, a FDD CDMA cellular mobile communication system using smart antenna can be implemented.

According to one aspect of the invention, a method for using smart antennas in a FDD wireless communication system is characterized as comprising the following steps:

a. Using a common baseband signal processor for downlink radio frequency transmitting and uplink radio frequency receiving but using independent smart antenna arrays, feeder cables and radio frequency transmitters or radio frequency receivers, respectively;

b. Signal direction-of-arrival estimate values that are obtained from the uplink receiving signal determine the direction of the main path of the uplink receiving signal; and c. Obtaining an expected downlink transmitting beam form according to the main path direction.

Wherein said signal direction-of-arrival estimate, obtained from the uplink receiving signal and used to determine the direction of the main path further includes the following steps: N receiving signal preprocessors demodulate and despread N digital signals coming from receiving antenna array and receivers; a receiving beam former makes a direction-of-arrival estimate for each digital signal, respectively; making a combination algorithm for every digital signal to perform receiving beam forming and getting the direction of the main path; and sending the direction-of-arrival estimate value of the main path to the downlink transmitting link. The combined digital signals are then recovered to original N receiving signals at a post-processor.

Wherein said signal direction-of-arrival estimate, obtained from the uplink receiving signal and used to determine the direction of the main path is performed at the common baseband signal processor of a base station.

Wherein said obtaining an expected downlink transmitting beam form according to the main path direction further includes the following steps: a basic digital signal processor performs basic processing, including channel coding, interleaving, spread spectrum modulation and radio frequency modulation, for every digital signal which waits to be sent and then sends them to a transmitting beam former; the transmitting beam former performs transmitting antenna beam forming for each digital signal with reference to the direction-of-arrival estimate value of the main path coming from the receiving beam former; for every transmitting link, a digital combination is performed in a digital combiner, respectively, and the generated M digital signals are sent to individual transmitters and transmitting smart antenna arrays.

Wherein said transmitting beam former performs transmitting antenna beam forming for each digital signal with reference to the direction-of-arrival estimate value of the main path coming from a receiving beam former, by adding an amplitude and a phase value needed for transmitting beam forming for data that waits to be sent to the transmitting smart antenna array.

Said combining an expected downlink transmitting beam form according to the main path direction is performed in the common baseband signal processor.

A digital signal transmission is performed by a radio frequency receiver through an A/D converter or by a radio frequency transmitter through a D/A converter, then through high-speed data bus to the common baseband digital signal processor.

Said downlink radio frequency smart antenna array and uplink radio frequency smart antenna array both can be one set or multiple sets of antenna arrays.

Said downlink beam form can be a pencil beam.

Said combination manner of the downlink transmitting beam forming is determined by the geometric structure of the transmitting smart antenna array.

According to another aspect of the invention, an apparatus for using smart antennas in a FDD wireless communication system includes a receiving antenna array and a transmitting antenna array comprising an antenna feed system, a radio frequency receiver connected with the receiving antenna array, a radio frequency transmitter connected with the transmitting antenna array and a common baseband signal processor; the radio frequency receiver and the radio frequency transmitter connect with the baseband signal processor through a data bus, and the radio frequency receiver and the radio frequency transmitter commonly using a frequency and timing unit.

Said receiving antenna array includes N receiving antenna units, connected with N radio frequency receivers through feeder cables, respectively. Said transmitting antenna array includes M transmitting antenna units, connected with M radio frequency transmitters through feeder cables, respectively. Wherein, M and N are each plus integers.

Said baseband signal processor is comprised of an uplink baseband signal processor and a downlink baseband signal processor. In the uplink beam forming, the uplink baseband signal processor sends the direction of arrival ("DOA") estimate value of the main path to the downlink baseband signal processor for downlink beam forming.

Said uplink baseband signal processor includes N receiving signal preprocessors which demodulate and de-spread N digital signals coming from the receiving antenna array and receivers; a receiving beam former which makes a DOA estimate for N digital signals coming from N receiving signal preprocessors, respectively, and combines the N digital signals; and a post-processor which recovers the combined digital signal to the original N receiving digital signals. Said downlink baseband signal processor includes a basic digital signal processor which performs some basic processing for each digital signal waiting to be transmitted; a transmitting beam former which makes transmitting antenna beam forming for each digital signal outputted from the basic digital signal processor with reference to the DOA estimate value of the main path coming from the receiving beam former; and a digital combiner which performs digital combination for every transmitting link to form M digital signals which are sent to the M transmitters and the transmitting antenna array with M antenna units.

In the invention, in a base station of a FDD CDMA mobile communications system, the radio frequency receiving and radio frequency transmitting individually use a smart antenna array. The antenna units, which constitute the smart antenna array, and associated feeder cables are connected to corresponding radio frequency transmitters or radio frequency receivers, respectively; then to a common baseband signal processor through an A/D converter or D/A converter, respectively.

In the invention, the direction of the main path is determined by using signal DOA estimate values obtained from receiving signals. Then, according to this main path direction, an expected transmitting beam form, for example a pencil beam, is obtained. The method of downlink beam forming is determined by a geometric structure of the transmitting antenna array, as is well-known in antenna array theory.

According to the method of the invention, in a FDD wireless communications system, a base station can totally obtain the smart antenna functions and characteristics in the uplink; and the smart antenna main functions are implemented in the downlink, including decreasing interference and increasing equivalent transmitting power.

In the invention, for uplink any manner of signal combination of a smart antenna can be used to fully bring the advantages of smart antennas into play. For downlink, especially in a mobile environment, the basic advantages of a smart antenna can be obtained; in addition, there is no strict relationship between downlink beam forming and a subscriber terminal position, and this has more advantages for a subscriber terminal working in a high-speed moving environment.

The methods and basic station apparatus of the invention can overcome the limitation and obstacles of applying smart antenna technology in a FDD CDMA mobile communication system, the limitation and obstacles are caused by electric wave propagation at uplink and downlink that is unsymmetrical. At the same time, cell coverage is improved, system capacity is increased greatly and cost is reduced.

Comparing the smart antenna of the invention in a FDD wireless communication system and the smart antenna in a TDD wireless communication system; although it is impossible to combine the multipath signals during downlink beam forming in a FDD wireless communication system and the advantage of combining multipath signals within a code chip width by using time delay is lost, because of having not considered the multipath signals combination in a downlink beam forming, however, the downlink beam forming is not sensitive to phase (time) and is very suitable for high-speed moving terminal. In this way, the problem of applying smart antenna technology in a high-speed moving environment is solved.

Experiments show that when applying smart antenna technology with the methods and apparatus of the invention in a base station of a FDD CDMA mobile communication system, the system will improve cell coverage, increase capacity, reduce costs and support working at high-speed moving environment.

DETAILED DESCRIPTION OF THE INVENTION

The invention will be further described in the following, with reference to drawings and embodiments.

The invention is a method and an apparatus for using smart antennas in a FDD CDMA wireless communication system. In the following, technical schemes and technical advantages of the invention will be described in detail by taking a FDD CDMA wireless communication system, such as a CDMA FDD system of IMT-2000, as an example.

Figure 1:
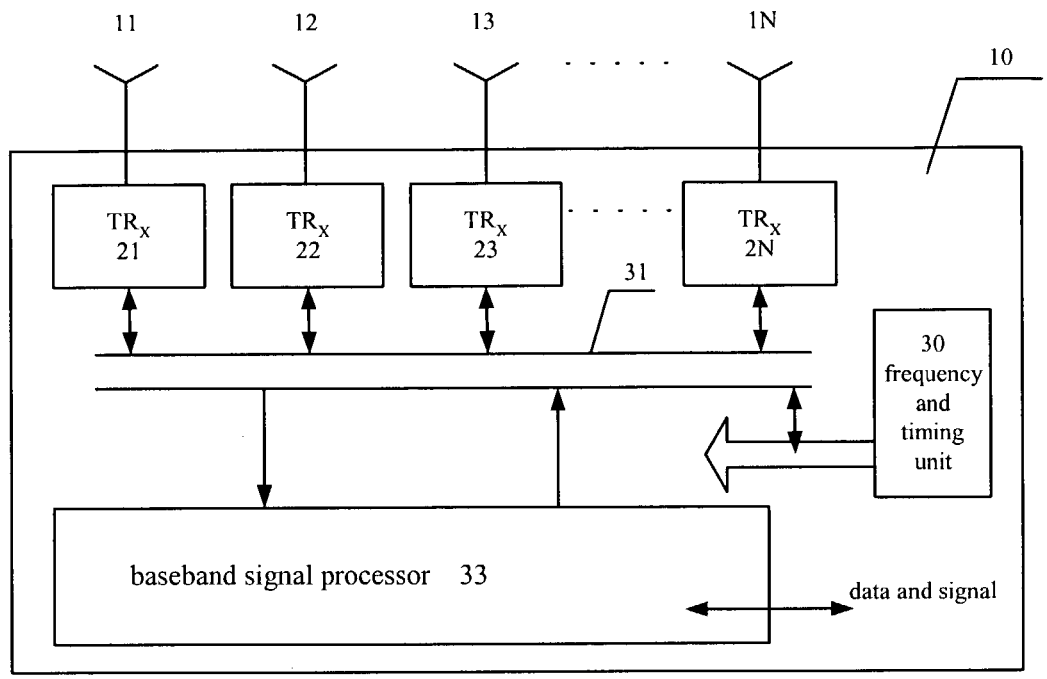
FIG. 1 shows a block diagram of an exemplary base station of a TDD wireless communication system with smart antenna.

FIG. 1 shows a block diagram of a wireless base station 10 for a TDD wireless communication system with a smart antenna. The base station works in a CDMA TDD mode. The antenna feed system of the base station is comprised of an antenna array of N antenna units 11, 12, 13, . . . , 1N, and associated feeder cables, (i.e., N antenna feeder cables). The N antenna feeder cables are correspondingly connected to N radio frequency transceivers TRx 21, 22, 23, . . . , 2N, respectively. The radio frequency transceivers commonly use a local oscillation source (frequency and timing unit) 30, (i.e., the N radio frequency transceivers TRx work coherently).

A received signal of each radio frequency transceiver is converted into a digital sampled signal through the inner analog digital converter (ADC). The digital sampled signal is sent to the high-speed data bus 31. A digital signal, waiting to be sent, on the high-speed data bus 31 is sent to a corresponding radio frequency transceiver TRx, and is converted to an analog signal through the inner digital analog converter (DAC). The analog signal is then transmitted through a corresponding antenna feed unit.

All baseband digital signal processing is performed in the baseband digital signal processor 33. For methods of baseband digital signal processing, reference related patents, such as Chinese Patent ZL 97 1 04039.7. With the present advanced digital signal processing (DSP) technology, the baseband digital signal processor 33 can implement functions, such as signal modulation and demodulation, receiving and transmitting beam forming, etc., overcome multi-address and multipath interference, raise receiving signal to noise ratio and sensitivity and increase equivalent isotropically radiate power (EIRP). One set of an antenna feed system, in a TDD wireless communication system base station with smart antennas, is simultaneously used for receiving and transmitting (TRx).

The description of FIG. 1 above is also the principle and concept of modern smart antennas.

Figure 2:
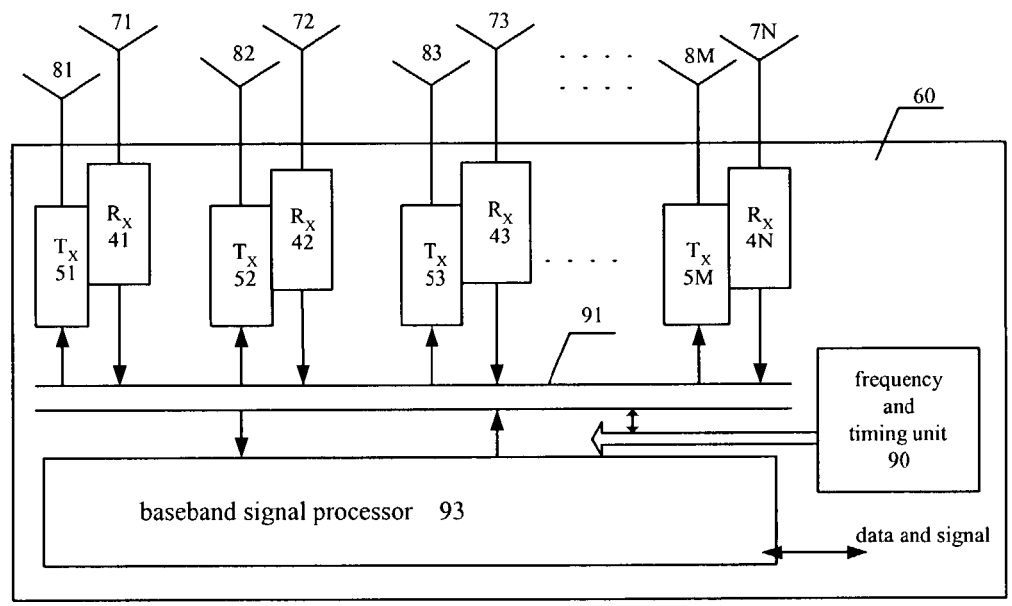
FIG. 2 shows a block diagram of an exemplary base station of a FDD wireless communication system with smart antenna in an embodiment of the present invention.

FIG. 2 shows an exemplary block diagram of a wireless base station 60 of an embodiment of the invention for a FDD wireless communications system with smart antennas. The base station works in a CDMA FDD mode. The antenna feed system of the base station includes two antenna arrays: receiving antenna array and transmitting antenna array. The receiving antenna array (uplink) includes N receiving antenna units 71, 72, 73, . . . , 7N and associated feeder cables, (i.e., it is comprised of N receiving antenna feed units). The N receiving antenna feed units are connected with N radio frequency receivers (Rx) 41, 42, 43, . . . , 4N, respectively. The transmitting antenna array (downlink) includes M transmitting antenna units 81, 82, 83, . . . , 8N and associated feeder cables, (i.e., it is comprised of M transmitting antenna feed units.) The M transmitting antenna feed units are connected with M radio frequency transmitters (Tx) 51, 52, 53, . . . , 5M, respectively. The radio frequency receivers and transmitters commonly use a local oscillation source (frequency and timing unit) 90, (i.e., the N radio frequency receivers and M radio frequency transmitters work coherently).

For uplink, a received signal of each radio frequency receiver (Rx) is converted to a digital sampled signal through the inner ADC, and then the digital sampled signal is sent to the high-speed data bus 91. In the wireless base station 60, baseband digital signal processing of the signals, coming from respective radio frequency receiving link, is performed in the baseband digital signal processor 93. The baseband digital signal processing includes demodulation, de-spread spectrum, overcoming various interference, obtaining a DOA estimate and receiving beam forming, etc. The method of the digital signal processing is same as the beam forming method of smart antennas in TDD wireless communication system. This can be referenced in the applicant's Chinese Patent ZL 97 1 040397, titled "Time Division Duplex Synchronization CDMA Wireless Communication System With Smart Antenna", and other correlative patents.

For downlink, a digital signal, waiting to be transmitted, is first processed with the basic digital signal processing, including channel allocation, channel coding, interleaving, I/O (in phase/quadrature phase) separation, modulation and spread spectrum, etc., in the baseband digital signal processor 93; then downlink beam forming is performed. The downlink beam forming is based on the DOA estimates obtained from the uplink baseband digital signal processing. Means for downlink beam forming include the use of well-known algorithms in antenna array theory. During downlink beam forming, digital signals to be sent to each transmitting link are added with a phase and amplitude value needed for beam forming; then through digital combination of multiple code channel signals, a digital signal, waiting to be transmitted, for each transmitting link is formed. The digital signal, waiting to be transmitted, is sent to a corresponding radio frequency transmitter (Tx) through high-speed data bus 91, respectively; after it is converted by the inner DAC, it will be an analog signal and will be transmitted through a corresponding transmitting antenna unit.

FIG. 2 shows an apparatus of an embodiment of the invention, which uses the uplink and downlink beam forming manner of the invention. Therefore, a wireless base station with a smart antenna is implemented in a FDD wireless communication system.

Figure 3:
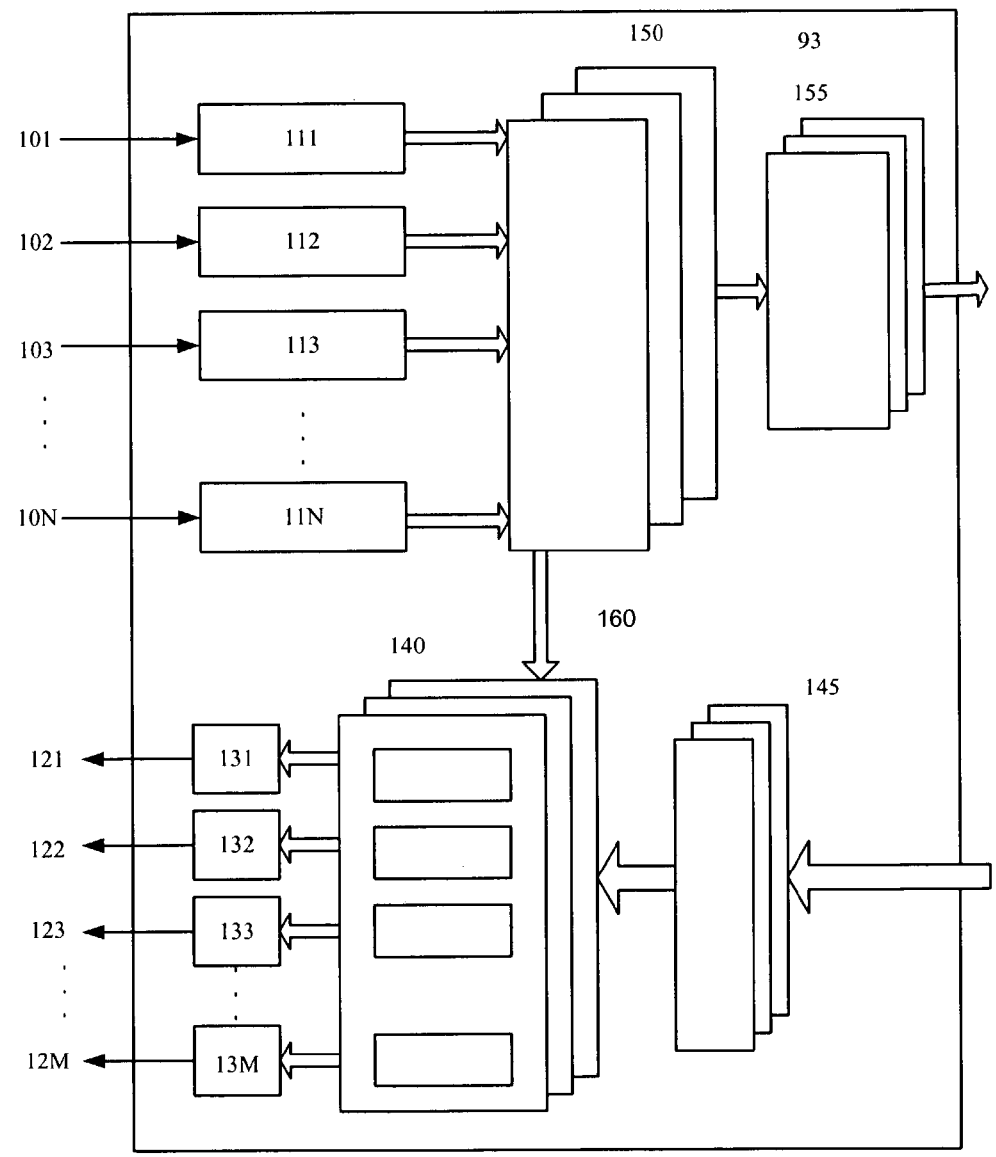
FIG. 3 shows an exemplary block diagram of a baseband signal processor and its signal processing in a base station for a FDD wireless communication system with smart antenna in an embodiment of the present invention.

In FIG. 3, taking a FDD CDMA wireless communication system as an example, a baseband digital signal processor and signal processing procedure are described in detail.

In the uplink baseband digital signal processor, N line digital signals 101, 102, 103, . . . , 10N, coming from a receiving antenna array and receiver, first enter the corresponding N receiving signal preprocessors 111, 112, 113, . . . , 11N, for demodulation and de-spread spectrum, respectively. Then, the signals enter receiving beam former 150 to make DOA estimates for each digital signals coming from a subscriber terminal, respectively, and to combine signals coming from every receiving antenna with a certain algorithm, (i.e., making receiving beam forming). The combined signal is recovered to the original receiving digital signals at the post-processor 155.

In the downlink baseband digital signal processor, each digital signal, waiting to be transmitted, has had some basic processing in the digital signal processor 145, then is sent to the transmitting beam former 140. The transmitting beam former 140 makes transmitting antenna beam forming for each digital signal with reference to the DOA estimates 160 coming from the receiving beam former 150. This means adding a needed amplitude value and phase value to each transmitting antenna data, which will be sent to each transmitting antenna soon. After that, for each transmitting link, the signal is combined at digital combiner 131, 132, 133, . . . , 13M to form M line digital signals 121, 122, 123, . . . , 12M to be sent to each corresponding transmitting link.

In FIG. 3, receiving beam former 150, post-processor 155, transmitting beam former 140 and digital signal processor 145 can be multiple physical units in an implementation (number of units relates to complexity of each unit). In FIG. 3, there are three overlapping blocks to represent the multiple units.

Figure 4A:
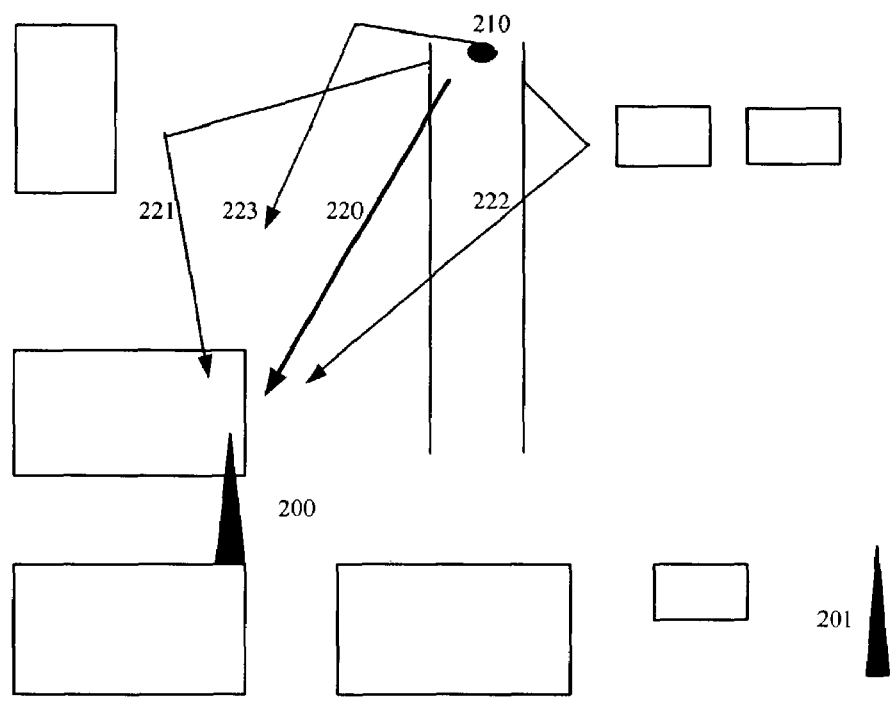
FIG. 4 shows exemplary beam-forming diagrams, including FIGS. 4A, 4B and 4C, for a FDD smart antenna system in an embodiment of the invention.
Figures 4B, 4C:
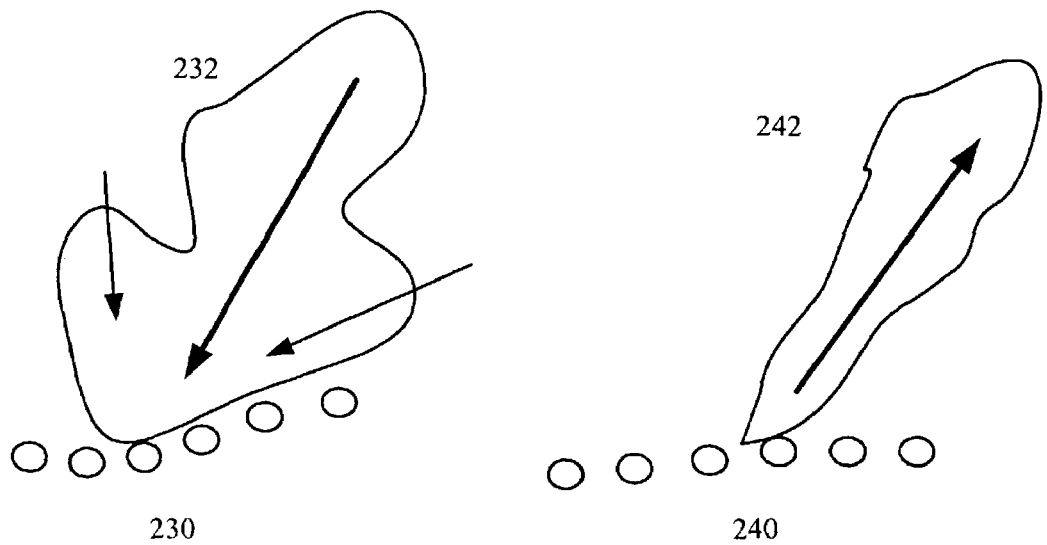

FIGS. 4A to 4C show an embodiment of a wireless base station with the smart antenna of the invention for a FDD CDMA mobile communication system.

FIGS. 4A to 4C show a typical mobile communication environment of a suburban area. In these Figs., there are two wireless base stations 200 and 201 and one subscriber terminal 210, and rectangular blocks represent buildings. The uplink signal between the wireless base station 200 and the subscriber terminal 210 includes the main path signal 220 and many multipath signal 221, 222, 223, . . . etc., caused by building reflections, etc. Along with different environments, the amplitude and time delay of each multipath signal is different. Suppose the time delay of the multipath signals 221 and 222 is within one code chip width, and time delay of other multipath signals exceeds one code chip width. After using the method and apparatus of the invention, the receiving antenna array 230 of the wireless base station 200 obtains a uplink receiving beam form, shown in FIG. 4B with 232, which uses energy of the main path and short time delay multipath effectively. As shown in FIG. 4C, the beam 242 (downlink beam) transmitted by transmitting antenna array 240 of the wireless base station 200 is formed according to the DOA estimates of uplink receiving beam. The downlink beam is only pointed to direction of the uplink main path 220. The downlink transmitting beam is a pencil form beam.

In general, since a subscriber terminal applies an isotropic antenna for receiving, the downlink beam, shown in FIG. 4C, has multipath components, generated during electric wave propagation because of reflections, etc. Therefore, in a subscriber terminal when processing baseband digital signals, it is desirable to overcome interference of these multipath components.

Obviously, the method and apparatus of the invention, after appropriately updated, can be used in other modes of a wireless communication system.

What is claimed:

1. A method for using smart antennas in a frequency division duplex (FDD) wireless communication system, comprising:

using an independent transmitting smart antenna array and an independent receiving smart antenna array, feeder cables, radio frequency transmitters/radio frequency receivers, and a common baseband signal processor in downlink radio frequency transmitting and uplink radio frequency receiving, respectively;

obtaining estimated values of signal direction-of-arrival (DOA) from an uplink receiving signal to determine the direction of a main path of the uplink receiving signal; and obtaining an expected downlink transmitting beam form according to the direction of the main path of the uplink receiving signal, wherein obtaining estimated values of signal DOA from an uplink receiving signal to determine the direction of a main path of the uplink receiving signal further comprises:

demodulating and de-spreading N digital signals of an uplink receiving signal by N receiving signal preprocessors, wherein said digital signals are coming from the receiving smart antenna array and the radio frequency receivers;

making the DOA estimate for each digital signal by a receiving beam former, respectively;

combining every digital signal to perform receiving beam forming, and getting the direction of the main path of the uplink receiving signal; and sending the DOA estimate value of the main path to the downlink transmitting link, and recovering the combined digital signal to original N receiving digital signals in a post-processor.

2. The method according to claim 1, wherein obtaining estimated values of signal DOA from an uplink receiving signal to determine the direction of a main path of the uplink receiving signal is performed in the common baseband signal processor of a base station.

3. A method for using smart antennas in a frequency division duplex (FDD) wireless communication system, comprising:

using an independent transmitting smart antenna array and an independent receiving smart antenna array, feeder cables, radio frequency transmitters/radio frequency receivers, and a common baseband signal processor in downlink radio frequency transmitting and uplink radio frequency receiving, respectively;

obtaining estimated values of signal direction-of-arrival (DOA) from an uplink receiving signal to determine the direction of a main path of the uplink receiving signal; and obtaining an expected downlink transmitting beam form according to the direction of the main path of the uplink receiving signal, wherein obtaining an expected downlink transmitting beam form according to the direction of the main path of the uplink receiving signal further comprises:

making basic processing, including channel coding, interleaving, spread spectrum modulation and radio frequency modulation, for each digital signal that is waiting to be sent by a basic digital signal processor and then sending the processed digital signals to a transmitting beam former;

making transmitting antenna beam forming by the transmitting beam former for each digital signal with reference to the DOA estimate value of the main path, coming from a receiving beam former; and digitally combining each transmitting link in a digital combiner, respectively, to generate M digital signals, and then sending the M digital signals to individual transmitters and transmitting smart antenna arrays.

4. The method according to claim 3, wherein making transmitting antenna beam forming is adding an amplitude and a phase value needed for transmitting beam forming for data which is waiting to be sent to the transmitting smart antenna array.

5. The method according to claim 3, wherein obtaining an expected downlink transmitting beam form according to the direction of the main path of the uplink receiving signal is performed in the common baseband signal processor of a base station.

6. An apparatus for using smart antennas in a frequency division duplex (FDD) wireless communication system, comprising:

an antenna feed system comprising an independent receiving antenna array and an independent transmitting antenna array;

a radio frequency receiver connected with the receiving antenna array;

a radio frequency transmitter connected with the transmitting antenna array, and a common baseband signal processor comprising an uplink baseband signal processor and a downlink baseband signal processor, the uplink baseband signal processor obtaining estimated values of signal direction-of-arrival (DOA) from an uplink receiving signal to determine the direction of a main path of the uplink receiving signal, the downlink baseband signal processor obtaining an expected downlink transmitting beam form according to the direction of the main path of the uplink receiving signal, wherein the radio frequency receiver and the radio frequency transmitter are connected with the baseband signal processor through a data bus, and the radio frequency receiver and the radio frequency transmitter commonly use a frequency and timing unit, and wherein the uplink baseband signal processor comprises:

- N receiving signal preprocessors, which demodulate and de-spread spectrum the N digital signals coming from the receiving antenna array and receivers;
- a receiving beam former, which makes DOA estimate for N digital signals, coming from N receiving signal preprocessors, and combines the N digital signals; and
- a post-processor, which recovers the combined digital signal to original N receiving digital signals.

7. An apparatus for using smart antennas in a frequency division duplex (FDD) wireless communication system, comprising:

- an antenna feed system comprising an independent receiving antenna array and an independent transmitting antenna array;
- a radio frequency receiver connected with the receiving antenna array;
- a radio frequency transmitter connected with the transmitting antenna array, and
- a common baseband signal processor comprising an uplink baseband signal processor and a downlink baseband signal processor, the uplink baseband signal processor obtaining estimated values of signal direction-of-arrival (DOA) from an uplink receiving signal to determine the direction of a main path of the uplink receiving signal, the downlink baseband signal processor obtaining an expected downlink transmitting beam form according to the direction of the main path of the uplink receiving signal, wherein the radio frequency receiver and the radio frequency transmitter are connected with the baseband signal processor through a data bus, and the radio frequency receiver and the radio frequency transmitter commonly use a frequency and timing unit, and wherein the downlink baseband signal processor comprises:

- a basic digital signal processor, which makes basic processing for each digital signal waiting to be transmitted;
- a transmitting beam former, which makes transmitting antenna beam forming for each digital signal outputted from the basic digital signal processor with reference to the DOA estimate value of the main path coming from the receiving beam former; and
- a digital combiner, which performs digital combination for every transmitting link to form M digital signals which will be sent to the M transmitters and transmitting antenna array.

* * * * *